(12) United States Patent
Azzarello et al.

(10) Patent No.: US 9,723,828 B2
(45) Date of Patent: *Aug. 8, 2017

(54) PEST CONTROL ABOVE-GROUND SYSTEM AND METHOD

(71) Applicants: Marcus Azzarello, New Orleans, LA (US); Joseph Azzarello, Metairie, LA (US)

(72) Inventors: Marcus Azzarello, New Orleans, LA (US); Joseph Azzarello, Metairie, LA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/392,708

(22) Filed: Dec. 28, 2016

(65) Prior Publication Data

US 2017/0105403 A1 Apr. 20, 2017

Related U.S. Application Data

(63) Continuation-in-part of application No. 15/215,165, filed on Jul. 20, 2016, which is a continuation-in-part of application No. 14/274,654, filed on May 9, 2014, now Pat. No. 9,433,201, which is a
(Continued)

(51) Int. Cl.
*A01M 1/20* (2006.01)
*A01M 1/02* (2006.01)
*A01M 1/24* (2006.01)

(52) U.S. Cl.
CPC .......... *A01M 1/2005* (2013.01); *A01M 1/023* (2013.01); *A01M 1/026* (2013.01); *A01M 1/24* (2013.01); *A01M 2200/011* (2013.01)

(58) Field of Classification Search
USPC ........................ 43/131, 132.1, 121, 133, 107
See application file for complete search history.

(56) References Cited

U.S. PATENT DOCUMENTS 5,592,774 A * 1/1997 Galyon ................. A01M 1/026
43/124
5,877,422 A * 3/1999 Otomo .................. A01M 1/026
340/573.2

(Continued)

*Primary Examiner* — Christopher P Ellis
(74) *Attorney, Agent, or Firm* — Keaty Law Firm, LLC

(57) ABSTRACT

A system and method of monitoring and controlling cellulose-consuming pests in a predetermined location above ground level or in the walls of buildings, such as on or in interior or exterior walls of residential or commercial buildings, aboard boats and watercraft, directly on infested support members like beams, studs, and joists, attached to landscape features like timbers, fences, and sheds, and on infested trees. The system is meant to be an attractive system to the termites, rather than an interceptor system like the present art. A plurality of cellulose-containing bait units are removably placed in the assembly. A moisture-retaining member is positioned in the upper portion above an uppermost of the bait units. A removable cap frictionally fittingly engages with the upper portion. The cap has an opening allowing liquid, such as water, to be poured into the main body to moisten the bait units and make them more attractive to foraging insects. If consumption of the cellulose material is detected, the bait units may be substituted with a bait material containing poisonous substance. The pests consume the bait and carry the poison to the colonies.

20 Claims, 6 Drawing Sheets

Related U.S. Application Data continuation-in-part of application No. 13/199,344, filed on Aug. 26, 2011, now abandoned.

(56) References Cited

U.S. PATENT DOCUMENTS

| | | | | |
|---|---|---|---|---|
| 6,016,625 A * | 1/2000 | Bishoff | | A01M 1/026 43/107 |
| 6,158,166 A * | 12/2000 | Snell | | A01M 1/026 43/121 |
| 6,401,384 B1 * | 6/2002 | Contadini | | A01M 1/026 43/107 |
| 6,474,015 B1 | 11/2002 | Lund et al. | | |
| 6,813,858 B1 * | 11/2004 | Wright | | A01M 1/026 43/124 |
| 6,860,062 B2 | 3/2005 | Spragins | | |
| 7,212,129 B2 * | 5/2007 | Barber | | A01M 1/026 29/825 |
| 7,937,886 B2 | 5/2011 | Bernard | | |
| 8,196,342 B2 * | 6/2012 | Tolley | | A01M 1/026 43/131 |
| 2001/0004237 A1 * | 6/2001 | Lake | | A01M 1/026 340/573.1 |
| 2002/0172658 A1 * | 11/2002 | Brode, III | | A01M 1/026 424/84 |
| 2003/0124166 A1 * | 7/2003 | Brode, III | | A01M 1/026 424/410 |
| 2005/0190063 A1 * | 9/2005 | Lewis | | A01M 1/026 340/573.2 |
| 2005/0284017 A1 | 12/2005 | Kongshaug et al. | | |
| 2007/0209271 A1 * | 9/2007 | Mediate | | A01M 1/026 43/132.1 |
| 2007/0256350 A1 * | 11/2007 | Cates | | A01M 1/026 43/132.1 |
| 2008/0104882 A1 | 5/2008 | Bernard et al. | | |
| 2009/0031611 A1 * | 2/2009 | Traniello | | A01M 1/2011 43/124 |
| 2009/0090045 A1 | 4/2009 | Baker | | |
| 2009/0300968 A1 | 12/2009 | Zajac et al. | | |
| 2010/0043276 A1 * | 2/2010 | Eger, Jr. | | A01M 1/026 43/131 |
| 2010/0083556 A1 * | 4/2010 | Wright | | A01M 1/026 43/1 |
| 2012/0222346 A1 * | 9/2012 | Nichols | | A01M 1/24 43/125 |
| 2014/0007489 A1 | 1/2014 | Bonacic Kresic | | |
| 2014/0109463 A1 | 4/2014 | Zajac et al. | | |
| 2014/0259880 A1 | 9/2014 | Gigliotti et al. | | |
| 2015/0027033 A1 | 1/2015 | Matsuura et al. | | |

* cited by examiner

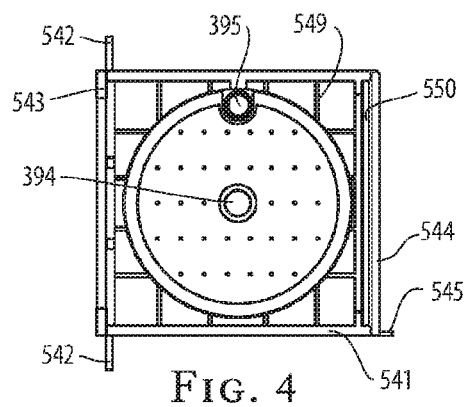
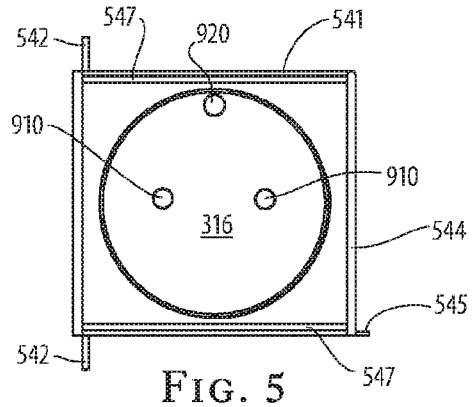
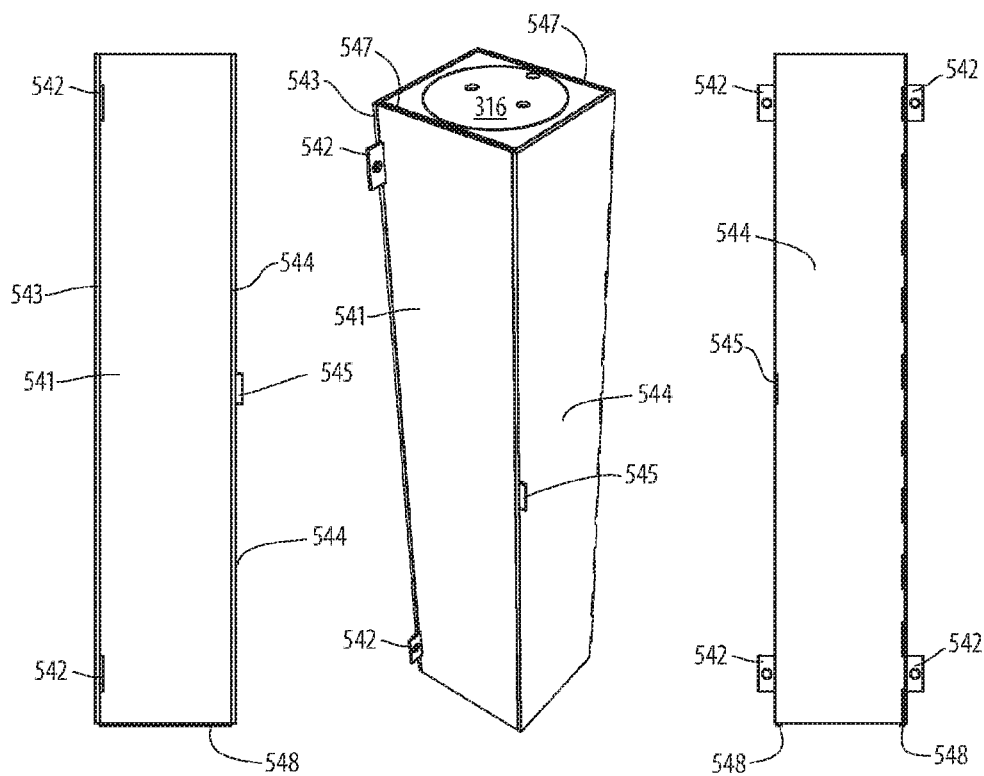
FIG. 4   FIG. 5   FIG. 6   FIG. 7   FIG. 8

PEST CONTROL ABOVE-GROUND SYSTEM AND METHOD

CROSS-REFERENCED TO RELATED APPLICATIONS

This application is a continuation-in-part of my application Ser. No. 15/215,165, filed Jul. 20, 2016, titled "Pest Control System and Method," which is a continuation-in-part of my application Ser. No. 14/274,654, filed May 9, 2014 and issued Sep. 6, 2016, titled "Pest Control System and Method," which is a continuation-in-part of my application Ser. No. 13/199,344, filed Aug. 8, 2011, now abandoned, the full disclosures of which are hereby incorporated by reference and priority of which is hereby claimed.

BACKGROUND

This invention generally relates to a pest control system, and more particularly to a system that allows attraction, interception, and elimination of colonies of cellulose-eating pests, such as termites, and other food foraging arthropods with minimal disturbance to the natural foraging of the pests.

Many pests, such as termites, are serious threats throughout much of the world to structures or other objects containing wood or other cellulose-containing components because these pests consume cellulose for nutrition. Subterranean termites, which typically dwell in the soil, often form large colonies. Members of the colony forage for food and thus burrow out passageways in the soil outwardly from the nest. Portions of the food located by the foraging termites are returned to the nest. Termites are also known to possess means for communicating the location of a food source to other termites within the colony. Termites invade residential and commercial structures, and even watercraft, moving along, and destroying, wooden or cellulosic poles, studs, beams, and sills.

*Coptotermes formosanus* is an invasive species of termite; it is often nicknamed the super-termite because of its destructive habits. This is due in part to the large size of its colonies, and the termites' ability to consume wood at a rapid rate. A single colony may contain several million individuals (compared with several hundred thousand termites for other subterranean termite species) that forage up to 300 feet (100 m) in soil. A mature Formosan colony can consume as much as 13 ounces (400 g) of wood a day and severely damage a structure in as little as three months. Because of its population size and foraging range, the presence of a colony poses serious threats to nearby structures. Formosan subterranean termites infest a wide variety of structures (including boats and high-rise structures), and can also damage landscaping and trees. In the United States, along with another species, *Coptotermes gestroi,* which has also been introduced from Southeast Asia, the Formosan termites are responsible for tremendous damage to property, resulting in large treatment and repair costs.

Another highly destructive type of termite is *Reticulitermes flavipes,* the eastern subterranean termite, which is the most common termite found in North America. These termites feed on cellulose material like the structural wood in buildings, wooden fixtures, paper, books, and cotton. A mature Formosan termite colony can range from 20,000 workers to as high as 5 million workers, and the queen of the colony lays 5,000 to 10,000 eggs per week. Both *Coptotermes formosanus* and *Reticulitermes flavipes* also feed on cellulose material above ground. In many instances, *Coptotermes formosanus* will build above-ground colonies in the wood they are consuming. These colonies may be associated with above-ground moisture such as rain, outdoor plant material, or moisture leaks in man-made structures. In such cases, the Formosan termites demonstrate a definite preference to feeding and colonizing at grade and above ground. Such termites do not need to return to the ground, and can invade to the top of a several-story structure if given a path of moist wood.

Many pest control systems are known and formed in a wide variety of configurations to monitor and eradicate the pests. One type of popular termite control system, for example, utilizes a monitoring bait food source that is placed below grade; the food source is available to the termites, which begin feeding from the device. The bait incorporates a toxic material, which once consumed, helps in the elimination or suppression of the entire termite colony. However, such systems may be ineffective against the termites that cannot locate the bait.

It has been observed that termites and other pests tend to find a vertical surface, along which they crawl from an underground location in search of food and water. Conventional colony-eradication devices are mostly of cylindrical configuration with smooth exterior walls that may prevent some of the pests from reaching the bait.

The present invention contemplates elimination of drawbacks associated with conventional pest control systems and provision of a pest control system designed to eradicate colonies of cellulose-eating insects inside buildings and structures.

SUMMARY OF THE INVENTION

This invention provides a pest-control system and method that is designed to eradicate foraging pests by increasing the likelihood of the foraging termites being attracted to the system and guided into finding the bait. These embodiments are intended for applications above ground level or in the walls of buildings, such as interior or exterior walls of residential or commercial buildings, aboard boats and watercraft, directly on infested support members like beams, studs, and joists, attached to landscape features like timbers, fences, and sheds, and on infested trees.

It is an object of the invention to provide a pest control above ground system and method of monitoring presence of pests, such as termites, in pre-selected locations.

It is a further object of the invention to provide a system and method that allows retention of moisture on the bait material for a considerable period of time, in the event of a period of less rain fall.

These and other objects of the invention are achieved through a provision of a system and method of monitoring and controlling cellulose-consuming pests in a predetermined location that provides for the use of an assembly that has a main body containing a plurality of cellulose-containing bait units, which act as an attractant to cellulose-consuming pests. The bait units may initially be cellulose-containing to act as an attractant to the cellulose-consuming pests, but alternate units may contain an active ingredient that acts as a poisonous material to the pests, or may contain an ingredient that further serves to control the environment of the system. One such ingredient may be naphthalene, which does not act as a deterrent to cellulose-consuming pests like termites, but does act as a deterrent to different pests like ants. The user may wish to insert such a naphthalene unit if, for instance, the ants have overrun the system to such an extent that it no longer serves as an effective termite bait-and-poison station. A moisture-retaining member can be positioned in the upper portion above an uppermost of the bait units. A removable cap frictionally fittingly engages with the upper portion. The cap has an opening with gasket, allowing liquid, such as water, to be poured into the main body to moisten the bait units without disturbing the foraging pests, thus making the bait more attractive to foraging insects. If consumption of the cellulose material is detected, the bait units may be substituted with a unit containing material comprising a poisonous substance, or altered by adding an interlocking, additional main box body, containing additional cellulose material or poisonous substance. The pests consume the bait and carry the poison to the colonies. These alternate sources and added attractant features of the system increase the chance of the insect actually finding and consuming the bait food source.

BRIEF DESCRIPTION OF DRAWINGS

Reference will now be made to the drawings, wherein like parts are designated by like numerals, and wherein:

FIG. 4 is a top sectional view of the pest control assembly of the invention;

FIG. 5 is a top view of the pest control assembly of the invention;

FIG. 6 is a side view of the pest control assembly of the invention;

FIG. 7 is a top perspective view of the pest control assembly of the invention;

FIG. 8 is a front view of the pest control assembly of the invention;

DETAILED DESCRIPTION OF THE INVENTION

Figure 1:
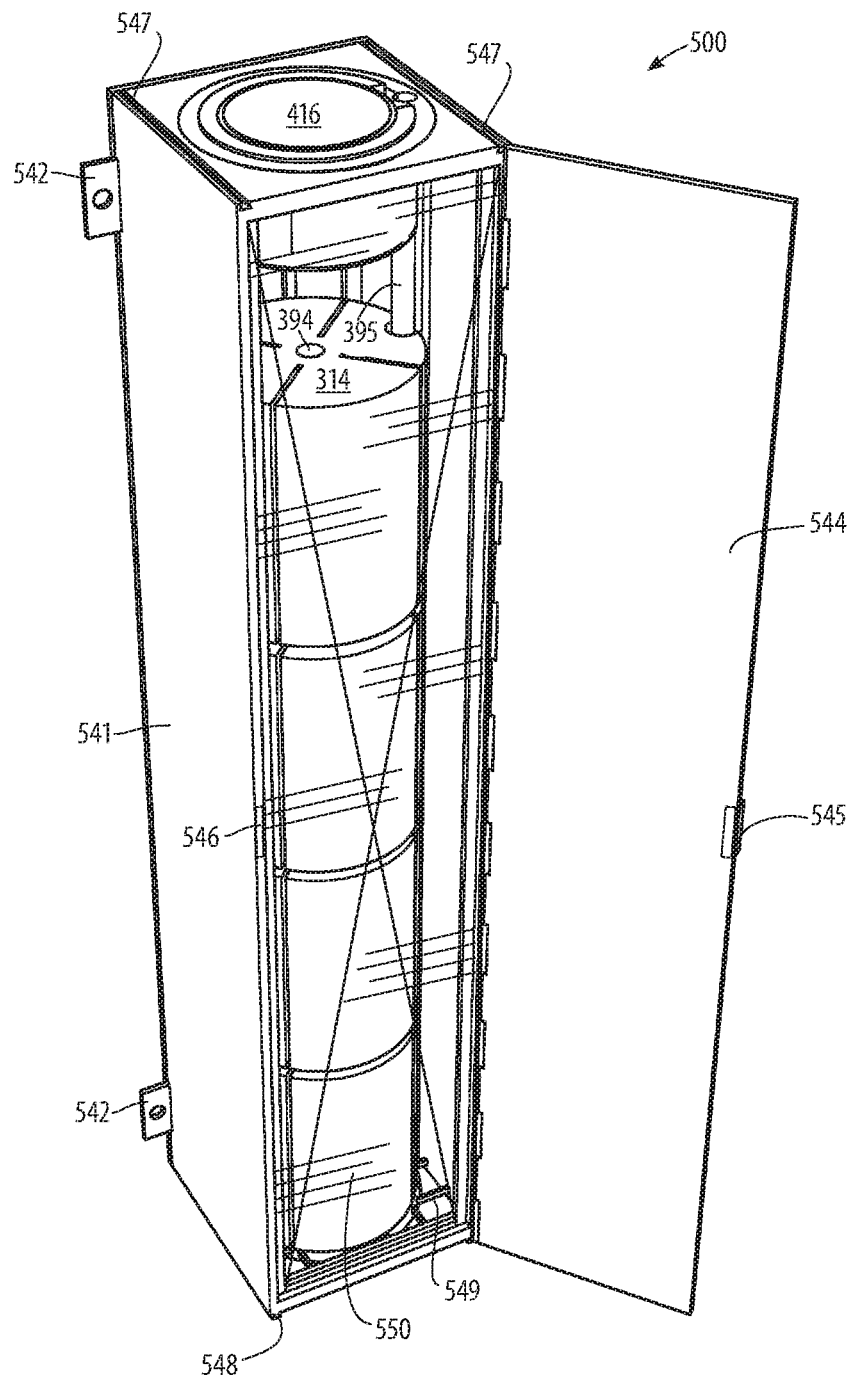
FIG. 1 is a front perspective view of the pest control assembly of the invention.
Figure 2:
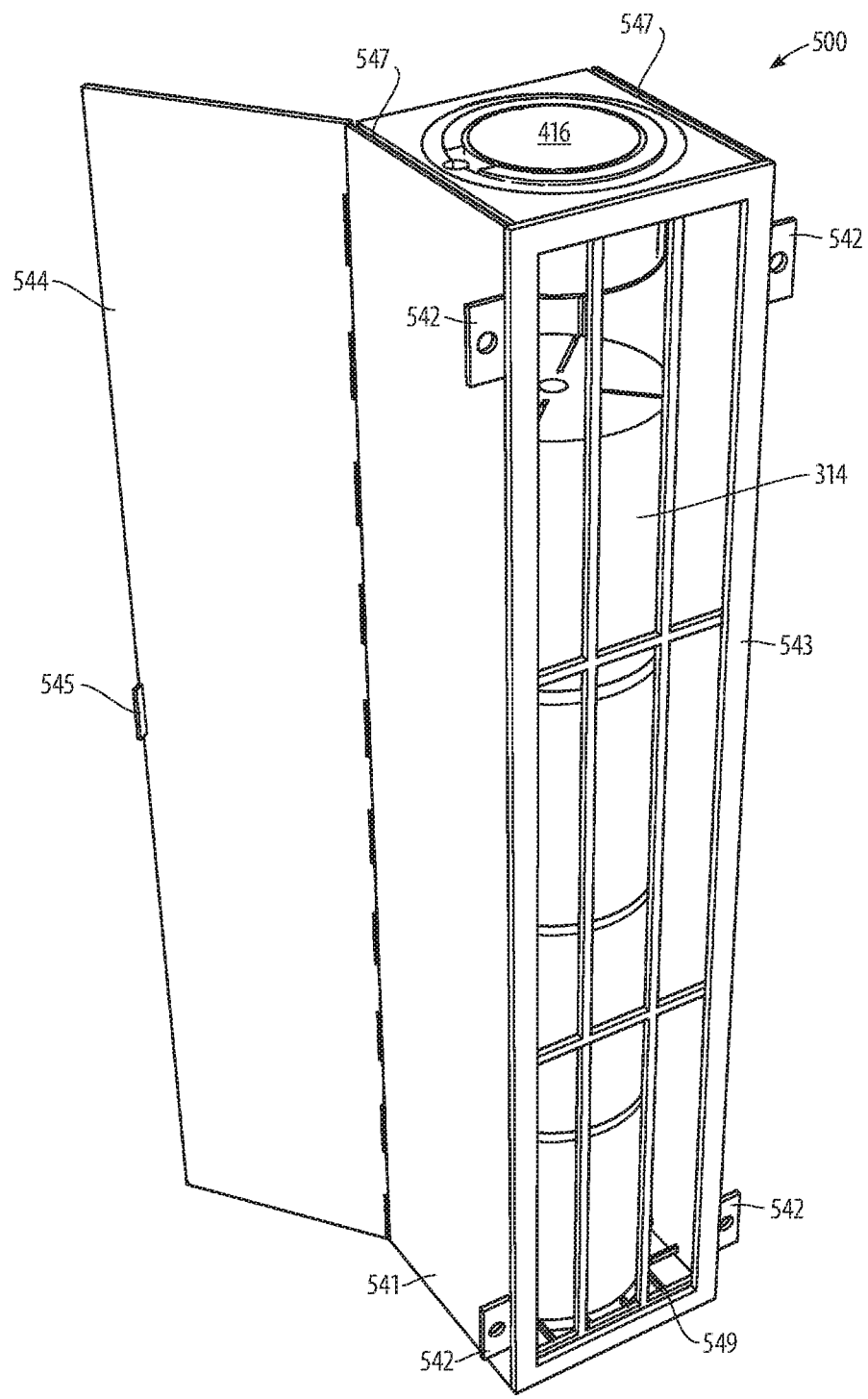
FIG. 2 is a back perspective view of the pest control assembly of the invention.
Figure 3:
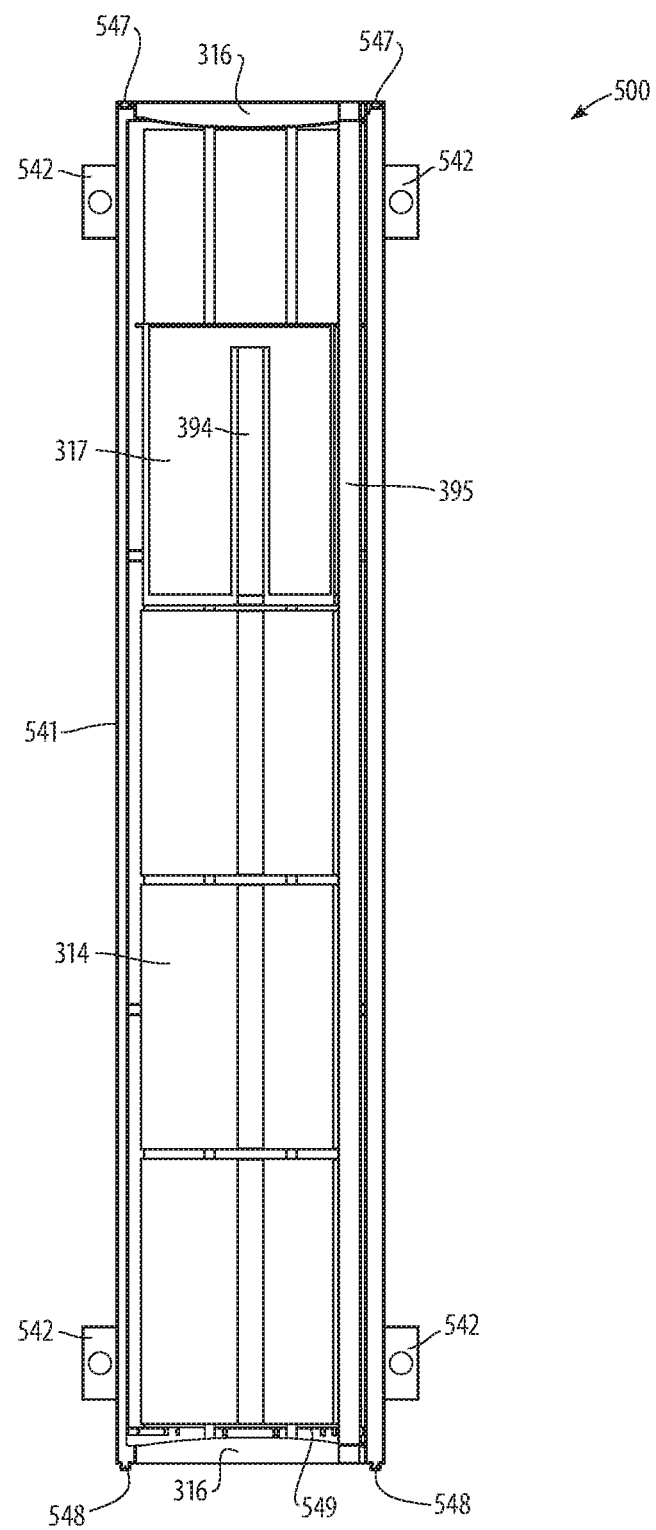
FIG. 3 is a front sectional view of the pest control assembly of the invention.

Referring now to the drawings, the pest control above ground system 500 provides a system and method of monitoring and controlling cellulose-consuming pests in a predetermined location above ground level or in the walls of buildings, such as interior or exterior walls of residential or commercial buildings, aboard boats and watercraft, directly on infested support members like beams, studs, and joists, attached to landscape features like timbers, fences, and sheds, and on infested trees. The system is primarily meant to be an attractive system to the termites, rather than an interceptor system like the present art. A plurality of cellulose-containing bait units are removably placed in the assembly. A moisture-retaining member is positioned in the upper portion above an uppermost of the bait units. A removable cap has an opening allowing liquid, such as water, to be poured into the main body to moisten the bait units and make them more attractive to foraging insects. If consumption of the cellulose material is detected, the bait units may be substituted with a bait material containing poisonous substance, or altered by adding an interlocking, additional main box body, containing additional cellulose material or poisonous substance, as discussed in more detail below. The pests consume the bait and carry the poison to the colonies.

The pest control above ground system assembly comprises a main box body 541, a plurality of axially aligned bait units 314 detachably engageable with the main box body 541, a removable cap 316 or alternate cap 416 fitted over the top of the main box body 541, and, optionally, a liquid-reservoir module 317 detachably mounted in the main box body 541 between the uppermost bait unit and the cap.

Figure 10:
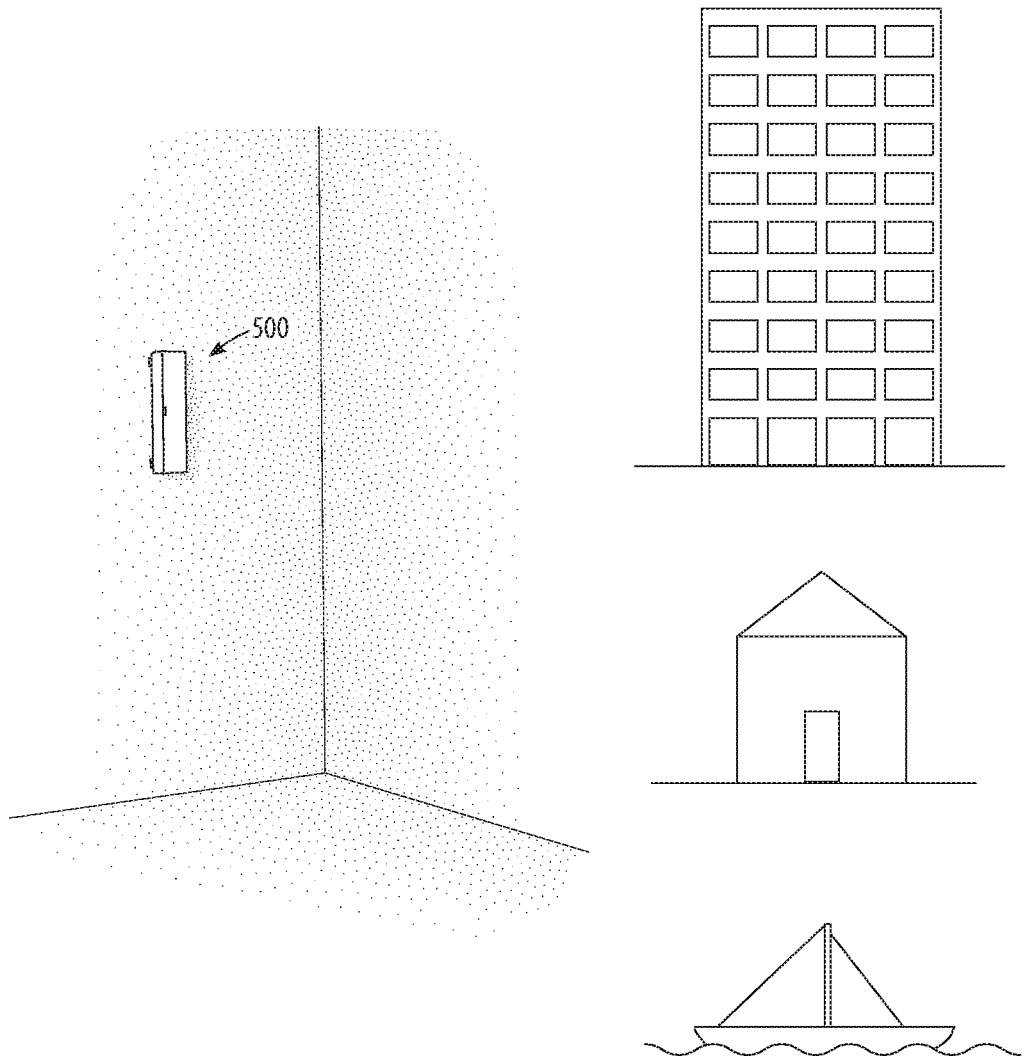
FIG. 10 is a schematic view of the pest control assembly of the invention in use in commercial buildings, residential buildings, and watercraft.

Referring briefly to FIG. 10, the pest control above ground system 500 is intended to be mounted either to the wall which covers an infested area, or directly to an infested member such as a beam, stud, joist, or rafter, in residential and commercial buildings, in wooden vessels such as boats, and on landscaping features such as infested trees, fences, or sheds.

The main box body 541 forms a box intended to be mounted on an internal or external wall covering an infested area such as a stud, or directly on a structure such as a beam, rafter, or column which is infested. In use, when mounted on a wall, the main box body 541 has an open front surface and a partially open back surface, which is closest to the wall. A mounting tab 542 or tabs are provided for attachment to the wall. The side surfaces of the main box body 541 are impermeable to light and air flow. The top surface of the main box body 541 accommodates a locking cap 316 or, optionally an alternate-feature cap 416 as disclosed below, and is otherwise impermeable to light and air flow. The bottom surface of the main box body 541 also accommodates a locking cap 316, and is otherwise impermeable to light and air flow. The locking cap 316 can be made with a universal, interchangeable design, so that the same cap can be used either at the top or at the bottom. The back surface of the main box body 541 is partially open to allow travel of termites between the wall over an infested area and the interior of the main box body. The back surface around its perimeter should provide enough solid face upon which to mount an adhesive foam gasket 543. The rest of the back surface can provide a few braces or bars for structural support, which may also serve as an attractive area for termite foraging activity. The open front surface of the main box body 541 is sealed in two ways. A transparent window 550 is provided to cover and seal the open front surface, to allow occasional visual inspection of the interior of the main box body, while preventing any significant air flow. A hinged door 544, which is impermeable to light and air flow, is provided to cover and close the front surface of the main box body 541. A door handle 545 is provided on the hinged door 544, and a magnetic latch 546 is provided to keep the hinged door 544 tightly closed except when opened for inspection. The presence of light or air flow will tend to repel, rather than attract, the termites. The main box body 541, with locking caps 316 in place and with the hinged door 544 closed, is therefore impermeable to light and air flow except at its partially open back surface. The adhesive foam gasket 543 forms a light- and air-tight seal between the perimeter of the back surface and the wall, and also compensates for irregularities on the wall surface.

The main box body 541 is configured to carry a plurality of bait units 314, which can be of the same size or of different sizes. A module stop 549 is provided at the bottom of the assembly to support the stack of bait units. The bait units 314 are formed from cellulose-containing substance, which is particularly attractive to subterranean and above-ground foraging pests, and may be formed as unitary bodies from a cellulose-containing substance. The moisture-retaining member can be formed to match the configuration of the uppermost bait unit and fit within the upper portion of the main box body 541. The moisture-retaining member is positioned above the uppermost bait unit. The moisture-retaining member can be formed from an open-cell foam material, such as sponge. The bait units 314 are stacked vertically inside the main box body. The lower bait units can be one or more in number, and may composed of cellulose-containing bait material, or may alternatively be composed of active-ingredient poisonous material or an alternative material that further serves to control the environment of the system. Additional bait units, which may be comprised of bait, active-ingredient, or alternative material, are stacked vertically, and can be also one or more in number. The bait units are vertically aligned such that the openings in the bait units define a central passageway for a vent shaft 394. The vent shaft 394 allows circulation of moisture to the bait unit so that they are kept moist to attract the termites. The moisture penetrates through openings and rises through the vent shaft 394.

In use, the user places cellulose-containing bait units 314 inside the main box body 541. The moisture-retaining member made of sponge material is placed above the uppermost bait unit. Liquid is added to the bait units to moisten the cellulose material.

In one aspect of the invention, it is preferred that the cellulose-containing bait units remain undisturbed for a period of time to give the foraging pests a chance to locate and feed on the cellulose. The user may occasionally inspect the baited assemblies. The user may use a sensor to check the conditions in the assembly. The collected data can be wirelessly sent via a wireless transmitter to a remote location, for instance a monitoring company. The user inspects the baited assemblies to ascertain whether the bait units 314 have attracted termites, or have otherwise affected the natural environment of the station. After the feeding has begun, poisonous termite bait with active ingredients may then be added to the assembly. If the system is used only for the purpose of monitoring the subterranean activity and detecting the presence of termites, no toxic bait need be added. If the user detects no activity in the system, the assembly can be relocated to a new site. Once the active-ingredient bait has been placed in the main box body 541, the termites feeding on the bait bring the bait to the colonies. As the toxic substance is consumed by termites, the bait with the cellulose substance is added to the assembly for a period of time for the bait to have the intended toxic effect on the colony. The system is periodically inspected to determine whether termites are active. Depending on the activity and the speed of consumption of the cellulose-containing material and the bait, a larger or smaller system can be substituted in the selected location. If the cellulose-containing material is consumed within a matter of days, a larger assembly may be needed to hold a larger quantity of cellulose-containing substance.

Figure 9:
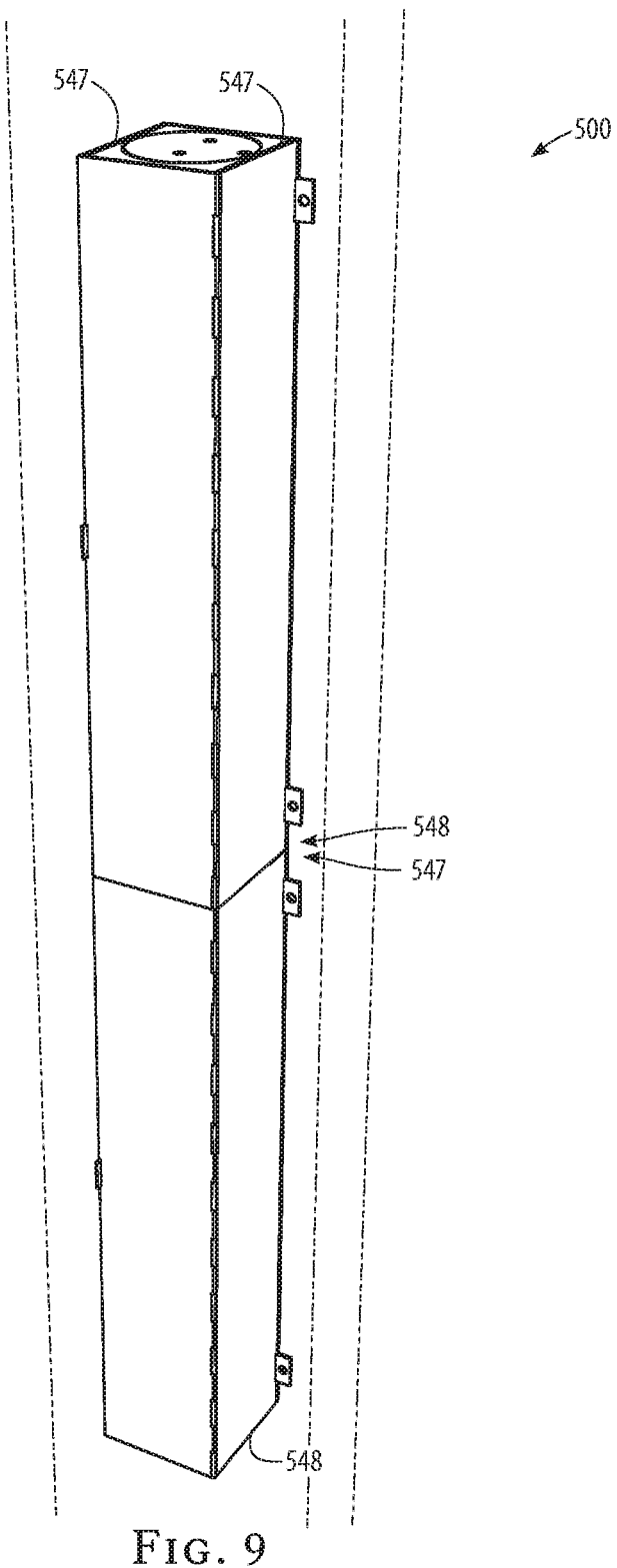
FIG. 9 is a perspective view of the stacking connection of main body units of the pest control assembly of the invention.

Referring briefly to FIG. 9, two or more main box bodies 541 can be attached together to form a larger assembly. Two tail rails 547 are formed into the top surface of the main box body 541, and two corresponding pin rails are formed upon the bottom surface of the main box body 541, allowing a dovetail connection. The distribution of the pin and tail rails on the top or bottom surfaces could be switched. When joining two assemblies together, the locking caps 316 at the bottom surface of the upper unit and the top surface of the lower unit are removed, and a continuous inner area is formed.

The easy removal, inspection, and/or replacement of the individual bait units 314, which minimizes disturbance of the overall system, allows for the user to potentially alter the cellulose or poison content of the system by, for example, replacing a cellulose bait unit with an active-ingredient bait unit when the termites are foraging, or by replacing an active-ingredient bait unit with a cellulose bait unit when the user wishes to attract more termites to the station. The units can be visually inspected through the transparent window 550 behind the hinged door 544. Although doing so will allow a certain amount of light into the assembly for a short period, there is no additional air infiltration allowed. Any air turbulence caused by the opening of the hinged door 544, and any air turbulence in the environment, is blocked by the transparent window 550.

The toxicant in the bait is preferably of the delayed-action type, or an insect growth regulator, pathogen, or metabolic inhibitor. Preferably, it comprises a nontoxic cellulose-containing bait composition to which the pesticide toxicant is added. Provided modules include a cellulose-food module 314, a moisture retaining and releasing sponge module, a refillable cartridge module, a one-time use or sealed cartridge module, and a liquid-reservoir module 317. The refillable cartridge module and the one-time use or sealed cartridge module may be comprised of active-ingredient, cellulose, or other desired material, such as naphthalene. Each module is essentially cylindrical in shape, with two void spaces or holes or channels along the long dimension of the cylindrical module. A central, axial vent hole accommodates the vent shaft 394, allowing movement of gasses and liquids among the modules, as disclosed in detail above. This central vent hole is likely to be essentially circular or cylindrical to accommodate the vent shafts, but to remain close to the vent shafts for efficient transfer of liquids and gasses. An additional channel called a port-void is provided along the side of the cylindrical module, essentially parallel with the central, axial hole. Although a range of positions and shapes of the port-void will function, the port-void must be the same on every module, so that all of the port-voids line up to form a single, continuous port-void when the invention is in use.

A portway 395 is provided in the main box body 541 as a continuous perforated riser tube from bottom to top of the main body. The port-voids of the various modules accommodate the portway 395.

The refillable cartridge module and the sealed cartridge module cartridges may be filled with any variety of active ingredients or attractants, so the orchestrator of the system may choose which cartridge to employ in any particular instance. The one-time use sealed cartridge module provides a tamper resistant cartridge for a single use. Because it is meant to be used only once, the cartridge remains sealed throughout its insertion into and removal from the system. In contrast, the reusable refillable active-ingredient cartridge may be added to, cleaned out, and so forth, when it is emptied or at any point during its use. Because it is meant to be refillable, the lid is removable rather than tamper-resistant like the one-time use cartridge.

In use, the vent shafts 394 of multiple, stacked sections line up to form a continuous riser shaft.

A locking cap 316 is provided to enclose the system. The locking cap 316 provides keyholes 910 for mounting or removing the top, and provides a porthole 920 aligned with the portway 395 below, allowing the temporary insertion of probes to measure conditions such as, without limitation, temperature, moisture, gas emissions, and the sounds or vibrations produced by, and indicating the presence of, insects. A locking tab provides for secure but removable mounting of the locking cap 316.

Another embodiment of the pest control above ground system and method 500 provides an alternate-feature cap 416 in lieu of a locking cap 316. The alternate-feature cap 416 mounts to the main box body 541 in the same way as the locking cap 316, and therefore can be used for various and changeable configurations of the system. The top surface of the alternate-feature cap 416, when mounted, sits at essentially the same level as the locking cap 316, which is essentially flush with the top surface of the main box body 541. The enhanced features of the alternate-feature cap 416 are housed in a portion of the cap that hangs down from the top surface, and occupies the upper portion of the space inside the main body, as shown.

The alternate-feature cap 416 provides various enhancements that may increase the productivity of the system. It may include, without limitation, a vibrator, which acts as an attractant to termites; a heating element, which controls the temperature and, accordingly, overall environment of the system; a battery bank or solar panel for power, or for emission of power current; and a sensor array for monitoring the various conditions of the system. The sensor array may include, without limitation, a microphone or camera to monitor the termite activity of the system. The alternate-feature cap 416 can provide an activity-indicator light or lights, optionally with a reflector. The light or lights of the alternate-feature cap 416 may also be optionally adjusted to act as a further attractant to the insects, which are traditionally attracted to a light source.

The sensor array can be provided with such capabilities or features as an upward-facing camera and/or light meter, a motion detector, a gas sensor, a thermometer, a thermo-imaging sensor, a microphone, a rain gauge, a hydrometer, a GPS system, and a USB port. The sensor array can optionally have data-storage, data-computation, and data-communication capabilities. The data captured by the sensor array provides important information, such as timing information, temperature, humidity levels, and so forth, in maintaining the effectiveness of a given installation of the system, and in making decisions about ongoing and future courses of treatment. The alternate-feature cap 416 may either be hard-wired for transmission or data, or may be configured wirelessly to allow for wireless transmission of data. Appropriate analysis of the data captured by the sensor array may lead to altering of the overall environment of the system, such as the temperature, humidity, and so forth, in a manner that creates a more attractive environment for the termites.

Many other changes and modifications can be made in the system and method of the present invention without departing from the spirit thereof. I therefore pray that my rights to the present invention be limited only by the scope of the appended claims.

What is claimed is:

1. A pest control above ground system assembly for controlling cellulose-consuming pests in a pre-determined location, the pest control above ground system assembly comprising:
   (i) a main box body adapted to be mounted to a wall, defining an inner area, having an open front, a partially open back, and sides, top, and bottom surfaces impermeable to light and air flow;
   (ii) a hinged door impermeable to light and air flow covering said front of said main box body;
   (iii) a magnetic latch adapted to keep said hinged door closed against said main box body;
   (iv) a door handle affixed to said hinged door, adapted to allow opening of said hinged door;
   (v) at least one mounting tab adapted for mounting said main box body to a wall;
   (vi) an adhesive foam gasket affixed to said partially open back of said main box body, adapted to create a seal with the wall which is tamper-proof and impermeable to light and air flow;
   (vii) a transparent window impermeable to air flow forming a front surface of said main box body;
   (viii) a portway extending vertically along the side of the inner area of said main box body, adapted to allow continuing access to the inner portion of said main box body, in use;
   (ix) at least one cellulose-food module fitted in the inner area of said main box body, and having a central essentially cylindrical void and a peripheral essentially cylindrical void;
   (x) a vent shaft adapted to allow for insect travel and for vertical distribution of gases and liquids within and between said cellulose-food modules;
   (xi) a locking top adapted to be removably attached to said main box body at said top surface; and
   (xii) a module stop placed inside and near said bottom surface of said main box body, adapted to support said cellulose-food modules;
   where, in use, said cellulose-food modules are supported by said module stop; gases and liquids are distributed vertically within said main box body by said vent shaft; said cellulose-food modules can be installed, removed, and re-installed; and monitoring of said system can be performed through said portway.

2. The pest control above ground system assembly of claim 1, further comprising a locking bottom adapted to be removably attached to said main box body at said bottom surface.

3. The pest control above ground system assembly of claim 1, further comprising two pin rails on said bottom surface of said main box body, and two corresponding tail rails on said top surface of said main box body, adapted to facilitate joining of said main box bodies.

4. The pest control above ground system assembly of claim 1, further comprising an alternate-feature cap adapted to capture, store, and transmit data from a sensor array.

5. The pest control above ground system assembly of claim 1, further comprising an alternate-feature cap adapted to provide at least one of heat or vibration, as needed, inside the inner cylindrical area of said main body and said extension sections.

6. The pest control above ground system assembly of claim 1, further comprising at least one liquid-reservoir module adapted to store liquid, such as water, and release said liquid at a controlled rate, and having a port-void to accommodate said portway.

7. The pest control above ground system assembly of claim 1, further comprising at least one sponge module adapted to absorb and store liquid, such as water, and release said liquid at a controlled rate, and having a port-void to accommodate said portway.

8. The pest control above ground system assembly of claim 1, further comprising at least one refillable cartridge module having a port-void to accommodate said portway.

9. The pest control above ground system assembly of claim 1, further comprising at least one sealed cartridge module having a port-void to accommodate said portway.

10. The pest control above ground system assembly of claim 1, further comprising a plurality of radial slots in said cellulose-food module and said sponge module, adapted to allow enhanced ventilation and migration of insects.

11. A pest control method for controlling cellulose-consuming pests in a pre-determined location, the pest control method comprising:
  (i) providing a pest control above ground system assembly, in turn comprising:
    (a) a main box body adapted to be mounted to a wall, defining an inner area, having an open front, a partially open back, and sides, top, and bottom surface impermeable to light and air flow;
    (b) a hinged door impermeable to light and air flow covering said front of said main box body;
    (c) a magnetic latch adapted to keep said hinged door closed against said main box body;
    (d) a door handle affixed to said hinged door, adapted to allow opening of said hinged door;
    (e) at least one mounting tab adapted for mounting said main box body to a wall;
    (f) an adhesive foam gasket affixed to said partially open back of said main box body, adapted to create a seal with the wall which is tamper-proof and impermeable to light and air flow;
    (g) a transparent window impermeable to air flow forming a front surface of said main box body;
    (h) a portway extending vertically along the side of the inner area of said main box body, adapted to allow continuing access to the inner portion of said main box body, in use;
    (i) at least one cellulose-food module fitted in the inner area of said main box body, and having a central essentially cylindrical void and a peripheral essentially cylindrical void;
    (j) a vent shaft adapted to allow for insect travel and for vertical distribution of gases and liquids within and between said cellulose-food modules;
    (k) a locking top adapted to be removably attached to said main box body at said top surface; and
    (l) a module stop placed inside and near said bottom surface of said main box body, adapted to support said cellulose-food modules;
  where, in use, said cellulose-food modules are supported by said module stop, gases and liquids are distributed vertically within said main box body by said vent shaft, said cellulose-food modules can be installed, removed, and re-installed, and monitoring of said system can be performed through said portway;
  (ii) installing said main box bodies of said pest control above ground system on the walls of the pre-determined location;
  (iii) installing at least one said cellulose-food module into each said main box body;
  (iv) monitoring said pest control above ground system for presence of cellulose-consuming pests;
  (v) adding a poison to the inner cylindrical area of each said main box body; and
  (vi) monitoring said pest control above ground system for elimination of cellulose-consuming pests.

12. The pest control above ground system method of claim 11, said pest control above ground system assembly further comprising a locking bottom adapted to be removably attached to said main box body at said bottom surface.

13. The pest control above ground system method of claim 11, said pest control above ground system assembly further comprising two pin rails on said bottom surface of said main box body, and two corresponding tail rails on said top surface of said main box body, adapted to facilitate joining of said main box bodies.

14. The pest control above ground system method of claim 11, said pest control above ground system assembly further comprising an alternate-feature cap adapted to capture, store, and transmit data from a sensor array.

15. The pest control above ground system method of claim 11, said pest control above ground system assembly further comprising an alternate-feature cap adapted to provide at least one of heat or vibration, as needed, inside the inner cylindrical area of said main body and said extension sections.

16. The pest control above ground system method of claim 11, said pest control above ground system assembly further comprising at least one liquid-reservoir module adapted to store liquid, such as water, and release said liquid at a controlled rate, and having a port-void to accommodate said portway.

17. The pest control above ground system method of claim 11, said pest control above ground system assembly further comprising at least one sponge module adapted to absorb and store liquid, such as water, and release said liquid at a controlled rate, and having a port-void to accommodate said portway.

18. The pest control above ground system method of claim 11, said pest control above ground system assembly further comprising at least one refillable cartridge module having a port-void to accommodate said portway.

19. The pest control above ground system method of claim 11, said pest control above ground system assembly further comprising at least one sealed cartridge module having a port-void to accommodate said portway.

20. The pest control above ground system method of claim 11, said pest control above ground system assembly further comprising a plurality of radial slots in said cellulose-food module and said sponge module, adapted to allow enhanced ventilation and migration of insects.

* * * * *